US008190796B2

(12) United States Patent
Winchester et al.

(10) Patent No.: US 8,190,796 B2
(45) Date of Patent: May 29, 2012

(54) HARDWARE SUPPORTED PERIPHERAL COMPONENT MEMORY ALIGNMENT METHOD

(75) Inventors: Neil Winchester, Dix Hills, NY (US); William Chiechi, Port Jefferson, NY (US); Paul Brant, Pelham, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 677 days.

(21) Appl. No.: 10/979,924

(22) Filed: Nov. 2, 2004

(65) Prior Publication Data
US 2006/0095611 A1    May 4, 2006

(51) Int. Cl.
*G06F 13/12* (2006.01)
*G06F 13/38* (2006.01)
*G06F 15/16* (2006.01)
(52) U.S. Cl. .................................. 710/62; 709/236
(58) Field of Classification Search .............. 710/62; 709/236
See application file for complete search history.

(56) References Cited

U.S. PATENT DOCUMENTS

| 5,313,582 | A | 5/1994 | Hendel et al. |
| 5,485,584 | A | 1/1996 | Hausman et al. |
| 5,499,341 | A | 3/1996 | Wilson et al. |
| 5,602,995 | A | 2/1997 | Hendel et al. |
| 5,818,844 | A | 10/1998 | Singh et al. |
| 6,067,300 | A | 5/2000 | Baumert et al. |
| 6,567,859 | B1 * | 5/2003 | Yang et al. ............ 709/250 |
| 2005/0251642 | A1 * | 11/2005 | Niell et al. ............ 711/201 |

FOREIGN PATENT DOCUMENTS
EP    0 574 140 A1    12/1993

OTHER PUBLICATIONS

Advanced Micro Devices, Am79C961, "PCnet™-ISA⁺ Jumperless Single-Chip Ethernet Controller for ISA" Publication No. 18183, Rev. B, Amendment /0, Apr. 1994.
ASIX Electronics Corporation, AX88198 L, "Fast Ethernet Controller with TCP/IP Stack: Local Bus Fast Ethernet Controller with TCP/IP Stack," Document No. AX88198-01/V.01/2003-11-0, Nov. 2003. Cirrus Logic, Inc. CS8900A Product Data Sheet, "Crystal LAN™ Ethernet Controller," Sep. 2004.
Davicom, DM9000, "ISA to Ethernet MAC Controller with Integrated 10/100 PHY," Final, Version DM9000-DS-F02, Jun. 26, 2002.
National Semiconductor Corporation, "DP83936AVUL-20/25/33 MHz Full Duplex SONIC™-T Systems-Oriented Network Interface Controller with Twisted Pair Interface," Jan. 1996.
STMicroelectronics, STE10/100A, "PCI 10/100 Ethernet Controller with Integrated Phy (3.3V)," Revision: A07, Nov. 2002.
International search report and written opinion of the international searching authority for application No. PCT/US2005/039360 mailed May 17, 2006.

* cited by examiner

*Primary Examiner* — Chun-Kuan Lee
(74) *Attorney, Agent, or Firm* — Meyertons Hood Kivlin Kowert & Goetzel, P.C.; Jeffrey C. Hood (57) ABSTRACT

A memory alignment system for efficient data transfer between a local memory that is configured in a host system, and a remote memory, comprises a data communications controller configured in the host system to align transmitted and received data based on formatting information received from the host system. When transmitting data from local system memory, for example over an Ethernet connection, communications control driver software may first write formatting information corresponding to the data into the data communications controller. The data communications controller is operable to align the data based on the formatting information as the driver software moves the data into a configurable transmit data buffer inside the data communications controller. Similarly, the driver software may write formatting information for receive data into a receive-format configuration buffer. The data communications controller may align the receive data based on the receive-formatting information as the receive data is being read by the host system. Because the data communications controller performs all the required data alignment, no data alignment by the host processor is required.

25 Claims, 9 Drawing Sheets

TX Command 'A'                                                      500

| Description |
|---|
| Interrupt on Completion. |
| Buffer End Alignment. This field specifies the alignment that must be maintained on the last data transfer of a buffer. The host will add extra DWORDs of data up to the alignment specified in the table below. The hardware is responsible for removing the extra DWORDs. This mechanism can be used to maintain cache line alignment on host processors. |
| Data Start Offset (bytes). This field specifies the offset of the first byte of TX Data. The offset value can be anywhere from 0 bytes to 31 bytes offset. |
| First Segment. When set, indicates that the associated buffer is the first segment of the packet. |
| Last Segment. When set, indicates that the associated buffer is the last segment of the packet |
| Buffer Size (bytes). Indicates the number of bytes contained in the buffer following the two command DWORDS (TX Command 'A' and TX Command 'B'). |

| [25] | [24] | End Alignment |
|---|---|---|
| 0 | 0 | 4-byte alignment |
| 0 | 1 | 16-byte alignment |
| 1 | 0 | 32-byte alignment |
| 1 | 1 | Reserved |

*FIG. 6A*

TX Command 'B'                                                      550

| Description |
|---|
| Packet Tag. Unique packet identifier to this field. This identifier is added to the corresponding TX status and can be used by the host to correlate TX status words with their corresponding packets. |
| Add CRC Disable. When set, the automatic addition of the CRC is disabled. |
| Disable Ethernet Frame Padding. This field prevents the automatic addition of padding to an Ethernet frame of less than 64 bytes. |
| Packet Length (bytes). This field indicates the total number of bytes in the current data communications packet. |

| Description |
|---|
| Filtering Fail. When set, this bit indicates that the associated frame failed the address recognizing filtering. |
| Packet Length. The size, in bytes, of the corresponding received frame. |
| Error Status (ES). When set this bit indicates that an error has been reported. This bit is the logical OR of bits 11, 7, 6, 1 in this status word. |
| Reserved. This bit is reserved. Reads 0 |
| Broadcast Frame. When set, this bit indicates that the received frame has a Broadcast address. |
| Length Error (LE). When set, this bit indicates that the actual length does not match with the length/type field of the received frame. |
| Runt Frame. When set, this bit indicates that frame was prematurely terminated before the collision window (64 bytes). Runt frames are passed on to the Host only if a Pass Bad Frames bit is set. |
| Multicast Frame. When set, this bit indicates that the received frame has a Multicast address. |
| Reserved. |
| Frame Too Long. When set, this bit indicates that the frame length exceeds the maximum Ethernet specification of 1518 bytes. This only indicates if a frame is too long, and will not cause the frame reception to be truncated. |
| Collision Seen. When set, this bit indicates that the frame has seen a collision after the collision window. This indicates that a late collision has occurred. |
| Frame Type. When set, this bit indicates that the frame is an Ethernet-type frame (Length/Type field in the frame is greater than 1500). When reset, it indicates the incoming frame was an 802.3 type frame. This bit is not set for Runt frames less than 14 bytes. |
| Receive Watchdog timeout. When set, this bit indicates that the incoming frame is greater than 2048 bytes through 2560 bytes, therefore expiring the Receive Watchdog Timer. |
| MII Error. When set, this bit indicates that a receive error was detected during frame reception. |
| Dribbling Bit. When set, this bit indicates that the frame contained a no-integer multiple of 8 bits. This error is reported only if the number of dribbling bits in the last byte is 4 in the MII operating mode, or at least 3 in the 10 Mbps operating mode. This bit will not be set when the Collision Seen bit[6] is set. If set and the CRC error[1] bit is reset, then the packet is considered to be valid. |
| CRC Error. When set, this bit indicates that a CRC error was detected. This bit is also set when the receive error pin is asserted during the reception of a frame even though the CRC may be correct. This bit is not valid if the received frame is a Runt frame, or a late collision was detected or when the Watchdog Timeout occurs. |

FIG. 8

RX Configuration Format

| Bits | Description |
|---|---|
| 31:30 | RX End Alignment. This field specifies the alignment that must be maintained on the last data transfer of a buffer. The APPARATUS will add extra DWORDs of data up to the alignment specified in the table below. The Host is responsible for removing these extra DWORDs. This mechanism can be used to maintain cache line alignment on host processors.<br><br>| [31] | [30] | End Alignment |<br>\|---\|---\|---\|<br>\| 0 \| 0 \| 4-byte alignment \|<br>\| 0 \| 1 \| 16-byte alignment \|<br>\| 1 \| 0 \| 32-byte alignment \|<br>\| 1 \| 1 \| Reserved \| |
| 29-28 | Reserved |
| 27-16 | RX DMA Count. This 12-bit field indicates the amount of data, in DWORDS, to be transferred out of the RX Data FIFO. After being set, this field is decremented for each DWORD of data that is read from the RX Data FIFO. This field can be overwritten with a new value before it reaches zero. |
| 15 | Force RX Discard. This self-clearing bit clears the RX Data and Status FIFOs of all pending data. When a '1' is written, the RX data and status pointers are set to zero. |
| 13-14 | Reserved |
| 12-8 | RX Data Offset. This field controls the amount of offset in bytes that is added to the beginning of an RX Data packet. The start of the valid data will be shifted by the amount of bytes specified in this field. An offset of 0-31 bytes is a valid number of offset bytes. |
| 7-0 | Reserved |

FIG. 9

HARDWARE SUPPORTED PERIPHERAL COMPONENT MEMORY ALIGNMENT METHOD

BACKGROUND OF THE INVENTION

1. Field of the Invention

This invention relates generally to the field of digital interface design and, more particularly, to communications interface design.

2. Description of the Related Art

Within the past two decades personal computers (PC) have joined television sets, high fidelity stereo equipment, and compact disc players as part of the vast array of electronic devices widely used in both the office and the home. In recent years the electronics marketplace has also seen a proliferation of appliances and personal electronics devices that use solid-state memory, in addition to devices that employ other widely used storage mediums. Some of the more popular devices include video cameras, photo cameras, personal digital assistants and portable music devices, among others. Corresponding to the proliferation of personal computers and associated peripheral devices has been an emphasis on connectivity and networking for transferring data between the personal electronic devices and personal computers, as well as for sharing the data between the personal computers themselves.

In addition to specifications for internal busses, such as the Peripheral Component Interconnect (PCI), various interface standards for connecting computers and external peripherals have also been introduced, each aiming to provide simple connectivity at high speeds. Examples of such standards include the IEEE 1394 standard also referred to as FireWire, and the Universal Serial Bus (USB), both high-speed serial bus protocols. The most widely used networking standard for connecting computers in both Local Area Networks (LANs) and Wide Area Networks (WANs) has been the Ethernet protocol. More specifically, Ethernet is the IEEE 802.3 series standard, based on the Carrier Sense Multiple Access with Collision Detection (CSMA/CD) method that provides a means for two or more computer stations to share a common cabling system. CSM/CD is the basis for Ethernet systems that range from speeds of 1 Mb/s through 1000 Mb/s. Ethernet generally makes efficient use of shared resources, is typically easy to reconfigure and maintain, and provides compatibility across many manufacturers and systems, while keeping the cost low.

Whether transferring data over the PCI bus, or between personal computers, peripheral devices and/or networks over FireWire, USB, or an Ethernet connection, processing of the data usually requires the movement of that data from one location of the host memory to another memory location. Various hardware methods may be used when transferring the data from one location to another. Examples of such methods include Programmed Input/Output (PIO), simple Slave Direct Memory Access (DMA), descriptor-based DMA, and combinations of PIO and DMA. The host memory could be internal to or associated with a processor, while the other location could be another host memory address or a peripheral hardware device attached to the host system also mapped in memory. This type of peripheral device is also referred to as a "Memory" mapped and/or "I/O" mapped device.

Most processors require that objects and variables constituting the data reside at particular offsets in the system's memory. For example, 32-bit processors typically require a 4-byte integer to reside at a memory address that is evenly divisible by 4. This requirement is generally called "memory alignment". Thus, for example a 4-byte integer can be located at memory address 0x2000 or 0x2004, but not at 0x2002. On many systems, for example 32-bit RISC CPU systems, an attempt to use misaligned data may result in a bus error, which might terminate the program altogether. In case of other systems, for example systems based on certain Intel processors, the use of misaligned data is generally supported but at a substantial performance penalty. There are often times specific memory alignment requirements that need to be met in order for the data to be moved efficiently. This is especially true in the embedded processor application space and associated system architectures, which in order to copy a data buffer from one location in the computer system to another will require software complexities that incur additional time, thus reducing overall system performance.

Memory alignment requirements may need to overcome limitations that include but may not be limited to cache line and/or address alignment. For example, regarding Ethernet data transfers, some network device driver environments send transmit packets to the device driver in nicely aligned single buffers that are both physically and virtually contiguous. In such cases alignment is not an issue. Other network device driver environments however may represent transmit packets as a linked list of buffer fragments of arbitrary length. Each buffer might start and end on an arbitrary byte boundary. Each buffer fragment might be virtually contiguous, containing one or more physical page break or breaks. Transmit packets with large payload data are more likely to contain physical system memory page breaks than smaller ones.

Many data communication controllers require that transmit data be presented to the controller in an aligned fashion. Since the data generally arrives to the driver in unaligned fragments, the driver must typically use the CPU to gather the scattered fragments and re-align the data before writing it to the network interface card (NIC). This process is illustrated in part in FIG. 1, where non-contiguous memory buffers 901 and 902 are not memory aligned on a 32-bit boundary. Buffers 901, and 902 contain data that may have been written into system memory by an operating system running on a processor or microcontroller configured in the system. Portions of the data, shown in boxes 910a through 910d are not part of the data to be transmitted, and may thus typically represent unwanted data for a data communications controller, which is generally configured in the system for transferring data to a remote memory. One example of such a data communications controller might be an Ethernet controller on a NIC for coupling the system to a LAN. The host system software, in conjunction with the data communications driver software (shown as CPU Software 910), may be required to copy the data buffers into a secondary data memory 903 where the data will typically be aligned. The host system software in conjunction with the data communications driver software then typically copies data buffer 903 into the data communications controller memory, as illustrated by buffer 904.

This process may often result in a waste of computing resources. In general, a reduction of data copying in a communications data flow increases throughput and reduces latencies. In addition, as previously mentioned, many processors have alignment restrictions often forcing a CPU to access the data as individual bytes regardless of the size of the CPU's internal registers and/or the width of the data bus. In order to meet memory alignment requirements for embedded systems that typically interface to a local bus other than a PCI bus, the ability to increase performance and flexibility of transferring the data from a processor or associated memory location to another memory or I/O mapped location may gain increased importance.

It should be noted that PCI, where memory misalignment may still be an issue, supports "Bus Master DMA", which is capable of addressing memory misalignment issues in certain systems. When a Bus Master DMA is used, the host LAN driver or operating system software typically programs the DMA controller to move specific data buffers with specific starting and ending addresses. In many cases, the Bus Master DMA controller can support moving multiple data autonomously via linked list software data structures, with descriptor elements embedded within the software data structures. Each descriptor may describe all of the parameters necessary for moving the data (for example start address, end address, and data length among other fields). The DMA Bus Master controller generally addresses Byte, Word, and Double Word alignment issues by using some form of hardware bus technology. For example, the PCI bus utilizes "Byte Enable" signals to determine system Byte, Word and Double Word accesses.

However, present systems that are not configured as Bus Master systems typically address memory misalignment issues, and handle memory alignment requirements, in software. Software solutions are generally time consuming and lead to a substantial reduction in system performance. For example, in the case of an Ethernet controller, there may be a need for efficient handling of transmit packets and receive packets, reducing the time as well as the required CPU cycles of each data transfer from or to the Ethernet network.

Other corresponding issues related to the prior art will become apparent to one skilled in the art after comparing such prior art with the present invention as described herein.

SUMMARY OF THE INVENTION

In one set of embodiments the invention comprises a memory alignment technology (MAT) apparatus operable to significantly increase the performance and flexibility of transferring data from/to a processor and/or associated memory location(s) to another memory and/or I/O mapped memory location, allowing for unaligned data transfers while meeting memory alignment requirements.

In one embodiment, the MAT apparatus is configured in a host system as an Ethernet controller and includes a host bus interface (HBI)—comprising, for example, a PIO controller—that may receive outgoing data from a local system memory also configured in the host system. In addition to the outgoing data, the HBI may also receive from the host system formatting information corresponding to the outgoing data. When the HBI is receiving the outgoing data from the local system memory, the outgoing data may be written to the HBI by communications driver software, for example LAN driver software for an Ethernet controller, running on a microprocessor or microcontroller configured in the host system. The LAN driver software may also write the corresponding formatting information to the HBI prior to writing the outgoing data.

In one embodiment, the HBI routes the outgoing data to a configurable transmit buffer comprised in the MAT apparatus while aligning the outgoing data based on the corresponding formatting information. The aligned outgoing data may then be transferred to a remote system and/or remote system memory through a media access control module coupled to a physical layer, for example an Ethernet MAC coupled to an Ethernet PHY, either or both of which may be comprised in the MAT apparatus. No alignment of the outgoing data by software running on the microprocessor or microcontroller is required since all necessary alignment of the outgoing data may be performed in hardware by the MAT apparatus.

In one embodiment, the MAT apparatus also includes a receive buffer that may receive incoming data from a remote system memory through the physical layer and media access control module. The LAN driver software may also write formatting information corresponding to the incoming data to the HBI prior to the receive buffer receiving the incoming data. The microprocessor or microcontroller may read the incoming data from the receive buffer to the local system memory through the HBI while aligning the incoming data based on the corresponding formatting information that has previously been written to the HBI by the LAN driver software.

The MAT apparatus may also include status buffers for both transmitting outgoing data and receiving incoming data, and the HBI may apply the additional information obtained from the status buffers when aligning the data.

Thus various embodiments of the invention may provide a system and method for efficiently transferring data between a local system memory and a remote system memory without requiring software running on the host system processor—or host system controller—to align data when data alignment is required, by performing all data alignment in a MAT hardware apparatus.

BRIEF DESCRIPTION OF THE DRAWINGS

The foregoing, as well as other objects, features, and advantages of this invention may be more completely understood by reference to the following detailed description when read together with the accompanying drawings in which:

FIG. 6A illustrates one embodiment of the format of Transmit Command A;

FIG. 6B illustrates one embodiment of the format of Transmit Command B;

FIG. 8 illustrates one embodiment of the format of the receive status register.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

As used herein, 'DWORD', or "Double Word" is used to reference a 32-bit size data word. "Local system memory" or "local memory" refers to a memory comprised in a host system and typically embedded in or directly interfacing with a central processing unit and/or central controller. "Remote system memory" or "remote memory" refers to a memory comprised in the host system but not embedded in or directly interfacing with the central processing unit and/or central controller, or a memory comprised in a remote system distinct from the host system. When comprised in the host system, a remote memory may represent memory embedded in a peripheral device and/or additional memory not directly interfacing to the host system's dedicated memory bus.

In one set of embodiments, the invention implements a memory alignment technology (MAT) apparatus and method that enables efficient handling of data movement between various subsystems, especially between a local memory and a remote memory. Preferred embodiments will be described based on two data path flow examples, a transmit flow and a receive flow. More specifically, the presented transmit and receive flows refer to an example of a MAT apparatus configured as a data communications controller, in this case an Ethernet Controller. However, alternate embodiments may include other data transfer communication mechanisms and/or methods and are not limited to data transmission over an Ethernet connection using an Ethernet controller. While not described in detail, alternate embodiments using transfer methods over system interconnects other than Ethernet, and data communications controllers other than an Ethernet controller are contemplated.

Figure 2:
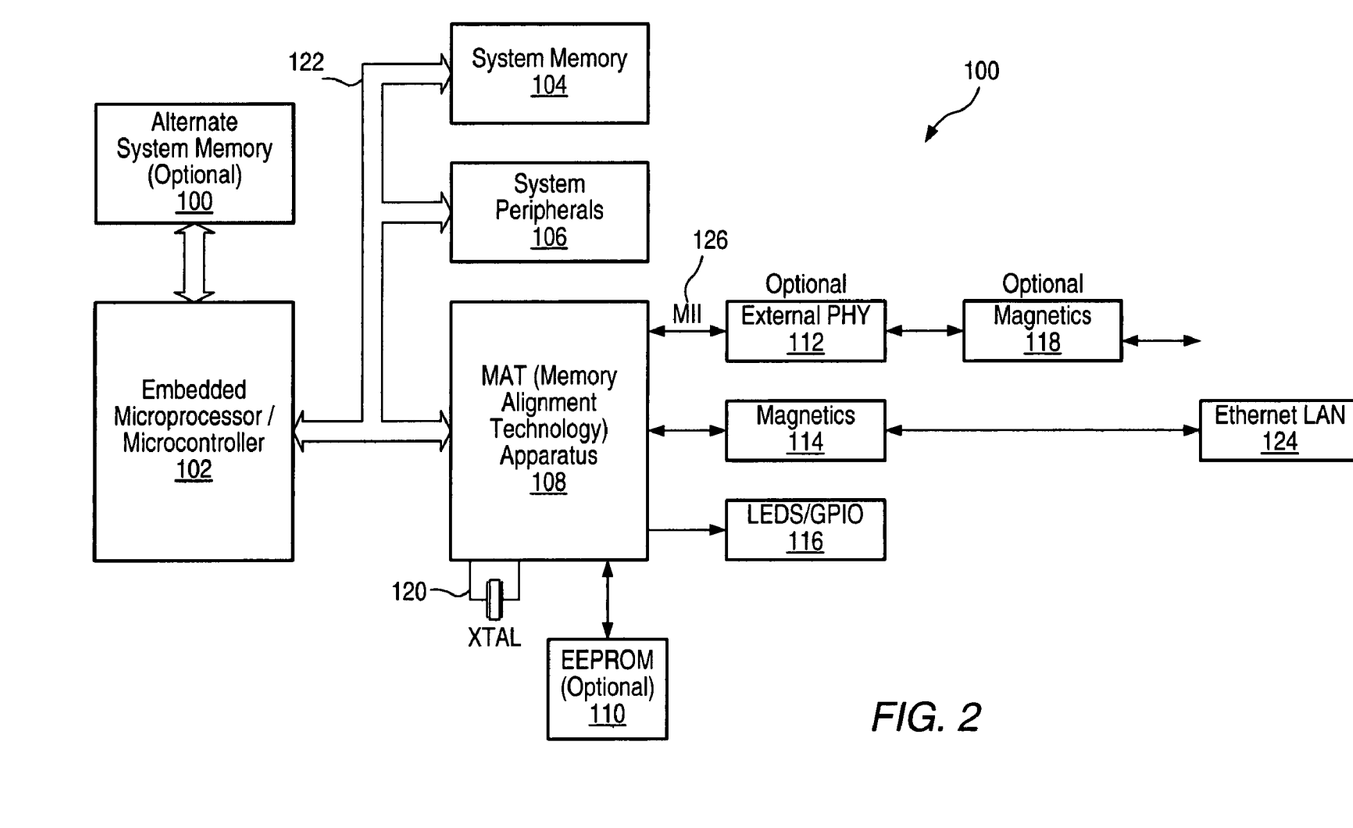
FIG. 2 shows one embodiment of a system incorporating a MAT apparatus.

A typical system and device level embodiment 100 is described in FIG. 2. As shown, a MAT apparatus 108 may interface to a shared local bus (or memory bus) 122, which may couple an embedded processor/microcontroller 102, a system memory 104, and possible system peripherals 106 to MAT apparatus 108. In many embedded processor environments the memory bus and system peripheral bus may be the same, as represented by shared bus 122 in FIG. 3. Each device may have a unique chip select (CS) signal, which may map the peripheral or memory device into system or I/O memory. The electrical and bus timing within system 100 may vary depending on each chip select. Chip select dependent timing may offer the advantage of peripheral and/or memory devices not having to share the same timing parameters within system 100.

In one embodiment, MAT apparatus 108 is coupled to a crystal/external oscillator 120 to obtain/generate an internal clock signal. MAT apparatus 108 may include a non-volatile memory to store Ethernet MAC address and additional configuration information. MAT apparatus 108 may connect to a transformer, illustrated as magnetics 114 in FIG. 2, where magnetics 114 may connect to an Ethernet LAN 124. Ethernet LAN 124 may be coupling magnetics 114 via copper wiring, typically CAT-5 cable, as the physical medium. MAT apparatus 108 may also be coupled to an external PHY layer device 112, where the coupling may be accomplished through a Media Independent Interface (MII) 126, such as an IEEE 802.3 standard interface.

Figure 3:
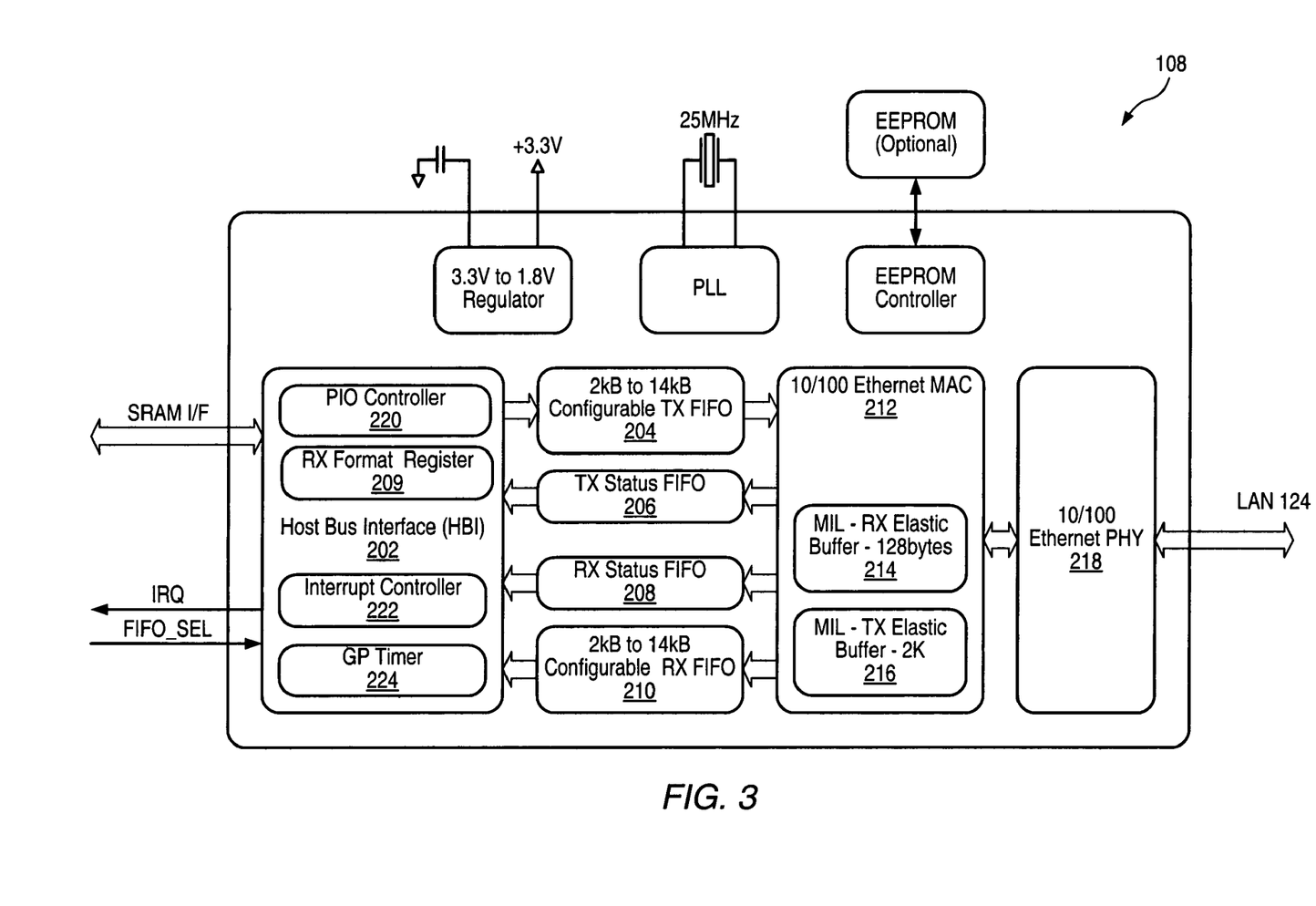
FIG. 3 shows a device level block diagram of one embodiment of a MAT apparatus.

FIG. 3 shows a device level block diagram of one embodiment of MAT apparatus 108, here configured as an Ethernet controller. In one embodiment, MAT apparatus 108 comprises a 10/100 Ethernet physical layer block 218 that may be an analog system operable to convert digital serial data streams to various encoding schemes such as 10/100 Base-T physical layer encoding, which may then be transferred to physical LAN 124. A 10/100 Ethernet Media Access Control (MAC) block 212 may be used to transmit and receive IEEE 802.3 layer 2 encapsulation format data. More generally, Ethernet MAC 212 represents an interface between HBI 202 and a coupled network's physical layer, where HBI 202 may act as a logical link of system 100. Thus, alternate embodiments where MAT apparatus is not configured as an Ethernet controller may include a MAC that is not an Ethernet MAC, depending upon the chosen communications data channels and/or protocol.

When receiving data, 10/100 Ethernet MAC 212 may parse the data for a start of frame sequence, which once found may result in storing Ethernet media access header information and the associated data (also referred to as payload data) into a receive buffer 214. In one set of embodiments, the integrity of the data may be verified through a cyclic redundancy (CRC) sequence. When transmitting data, Ethernet MAC 212 may accept packet data from configurable transmit FIFO 204, and it may initiate a sequence of serial octet bytes (an Ethernet packet), through transmit buffer 216. A checksum sequence may also be appended to the data for data validation purposes. As illustrated in FIG. 3 and expressed above, MAT apparatus 108 may also include a number of memory elements, such as buffers 206, 208, and FIFOs 204 and 210, which are operable to store the Ethernet receive and transmit packets during various stages of processing. The memory elements may be required due to both hardware and software related latency issues of the Host system.

In one embodiment, MAT apparatus 108 also includes a Host bus interface (HBI) 202, which comprises multiple blocks dedicated to performing a variety of functions. In this embodiment, HBI 202 includes a general-purpose timer 224 and interrupt controller 222, while also implementing the data alignment functionality of MAT apparatus 108, enabling MAT apparatus 108 to efficiently move data from the Host system memory (for example, system memory 104 in FIG. 2), alternate system memory (101 in FIG. 2), or even memory which may reside within the embedded processor (102 in FIG. 2).

Figure 1:
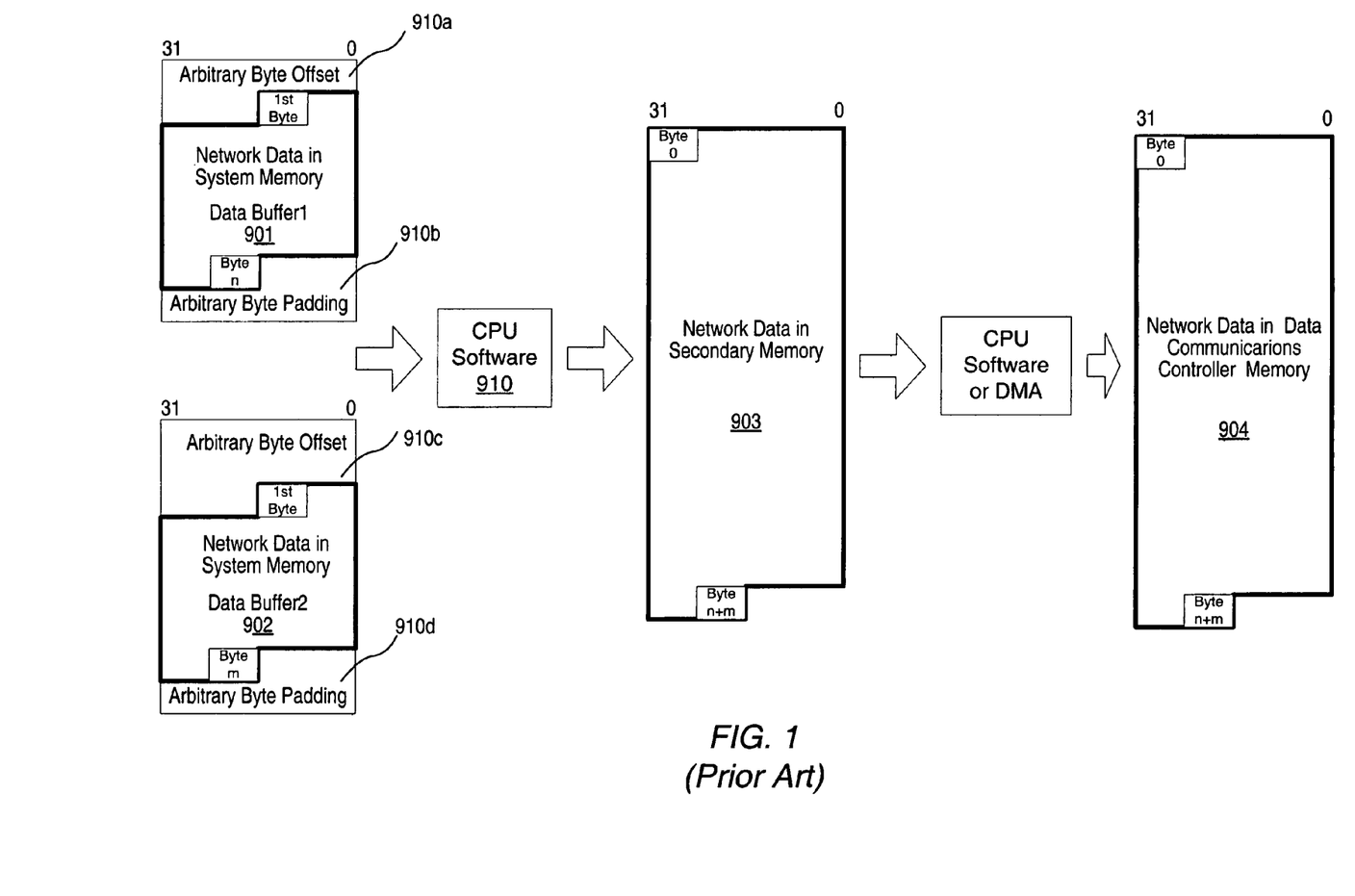
FIG. 1 illustrates how data buffer fragments are typically passed to a data communications controller from local system memory, according to prior art.
Figure 4:
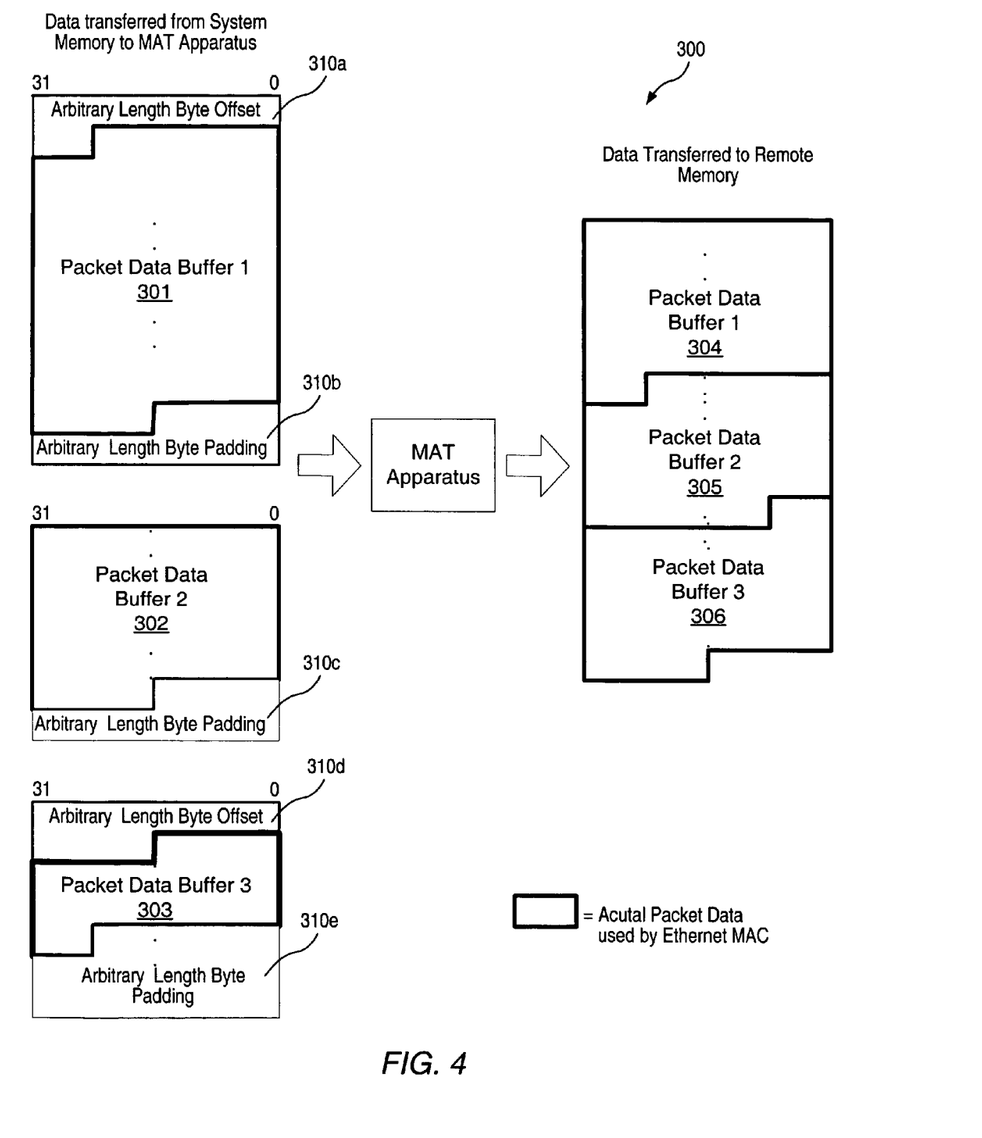
FIG. 4 illustrates how memory buffer fragments are aligned when passed from a local system memory to a remote system memory by the MAT apparatus, according to one embodiment.

Referring now to FIG. 4, as illustrated, certain network device driver environments may represent transmit data packets as a linked list of buffer fragments of arbitrary length, as opposed to aligned single buffers that are both physically and virtually contiguous (as also previously shown in FIG. 1). Typically, transmit packets with large payload data are more likely to contain physical system memory page breaks than smaller ones. For such packets, each buffer may start and end on an arbitrary byte boundary. Each buffer fragment may be virtually contiguous and may contain one or more physical page break or breaks. FIG. 4 shows non-contiguous memory buffers 301, 302 and 303 that are not memory aligned on a 32-bit boundary. Buffers 301, 302 and 303 contain data written into system memory 104 (referring to FIG. 2) by an operating system that may be running on embedded processor 102. Portions of the data, shown in boxes 310a through 310e are not part of the data to be transmitted and may thus represent unwanted data for Ethernet MAC 212. The LAN driver software that may be executed by processor 102 may pass the data in buffers 301, 302, and 303 to HBI 202, more specifically to PIO Controller (PIOC) 220, as illustrated by buffers 304, 305 and 306, which are now contiguous. HBI 202 may discard the offset data (arbitrary length byte offsets 310a and 310d) and padding data (arbitrary length byte padding 310b, 310c, and 310e) and allow Ethernet MAC 212 access to aligned data 304, 305, and 306. While the embodiment shown contains a PIO controller (PIOC 220), alternate embodiments may contain controllers for different data transfer mechanisms, for example a Slave DMA controller.

Figure 5:
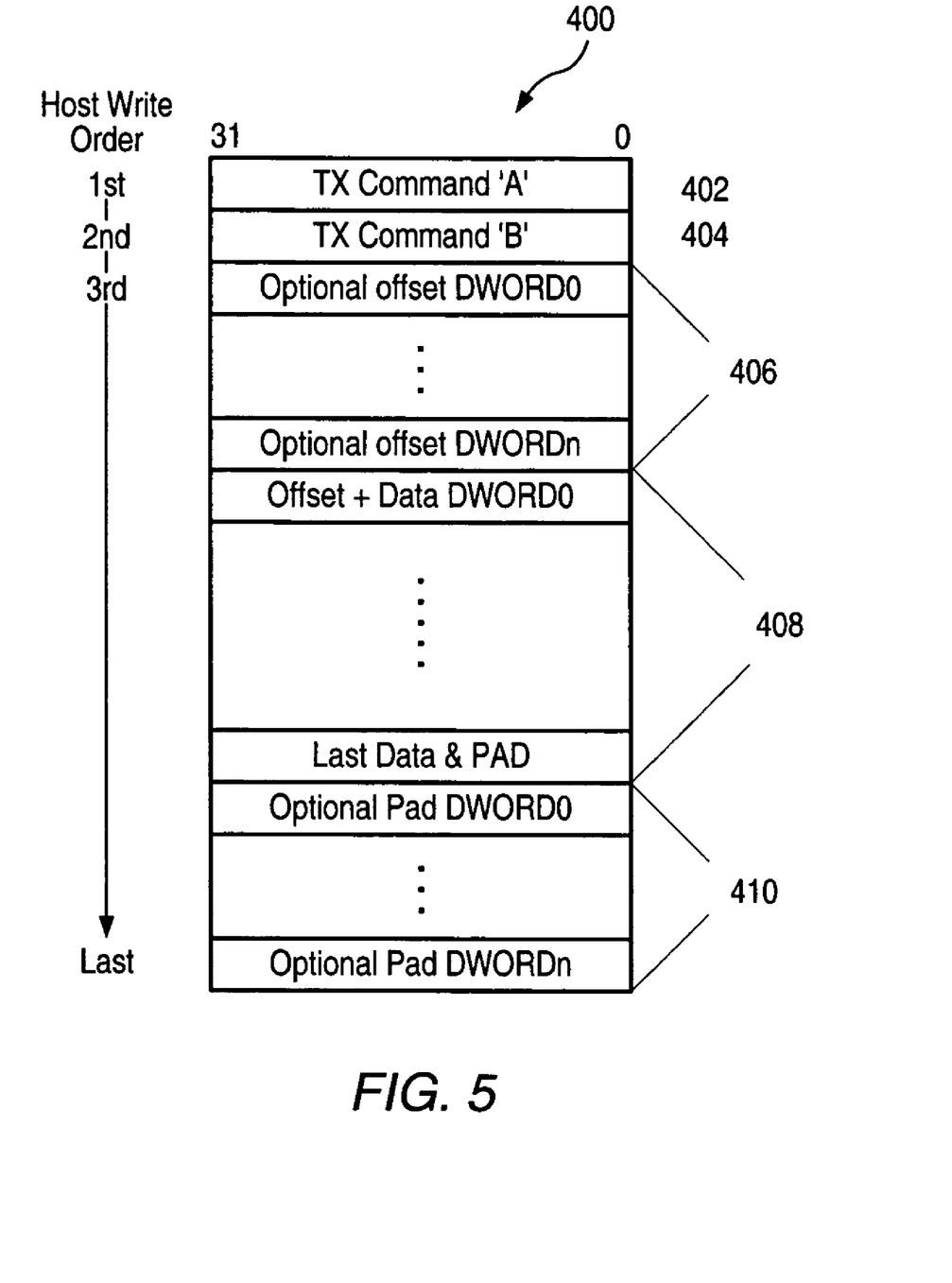
FIG. 5 illustrates one embodiment of the format of a transmit buffer.

In one embodiment, during data transfer and prior to passing the data from system memory 104 to PIOC 220, LAN driver software writes transfer command information to PIOC 220 to instruct PIOC 220 on the handling of the associated data, per buffer. PIOC 220 may then align the data, per buffer, based on the transfer command information, and subsequently route the data to be written into transfer FIFO 204. FIG. 5 illustrates a transfer buffer format 400 according to one embodiment of the invention. As shown, data 408 to be transmitted may be preceded by a first transmit command 402 and a second transmit command 404, (labeled TX command A and TX command B). In one embodiment, TX command A 402 and TX command B 404 each comprise 32 bits. TX command A 402 and TX command B 404 may be written into dedicated registers situated inside PIOC 220.). In alternate embodiments, TX command A 402 and TX command B 404 may be written into the same buffer as the actual packet data inside PIOC 220. As also illustrated in FIG. 5, each individual buffer may have an optional offset 406 at the beginning, and alignment padding 410 at the end. By allowing programmable offsets, fragmented unaligned buffers can still benefit from increased performance of burst transfers without requiring processor 102 to align the buffers prior to the data being passed on to PIOC 220.

FIG. 6A and FIG. 6B illustrate the format of TX command A 402 and TX command B 404, respectively, according to one embodiment. As listed in FIG. 6A, TX command A 402 may include an interrupt enable bit, as well as buffer end alignment, data start offset, first packet segment, last packet segment, and buffer size information. As listed in FIG. 6B, TX command B 404 may include a 16-bit packet tag, in addition to a cyclic redundancy check (CRC) disable bit, an Ethernet frame padding disable bit, and packet length information. For communication over an Ethernet connection, a packet may be an Ethernet packet that may contain data and corresponding information for one or more buffers. The packet tags may, if host software (for example the LAN driver software) is so configured, be unique for each packet (i.e., an incrementing count). The value of a packet tag for an associated packet may be returned in TX Status FIFO 206 (in FIG. 3). The Packet tag may be used by the host software to uniquely identify each status word, or it may be used to carry numerous other possible statistical values as it is returned to host system 100.

In one embodiment, both TX Command A 402 and TX Command B 404 may be required for each buffer in a given packet, and TX Command B 404 may have to be identical for every buffer in a given packet. Referring again to FIG. 5, as previously shown, the transmit data 408 section may begin at the third 32-bit word in the transmit buffer, following TX Command A 402 and TX Command B 404. The location of the first byte of valid buffer data to be transmitted may be specified in the Data Start Offset field of the TX Command A 402, as referenced in FIG. 6A. Table 1 shows the correlation between the setting of the least significant bits (LSBs) in the Data Start Offset field and the byte location of the first valid byte of transmit data 408, according to one embodiment. Transmit data 408 may be offset by any size of additional 32-bit words. In the embodiment shown, transmit data 408 is offset by up to seven additional 32-bit words as indicated by the upper three most significant bits (MSBs) [bits 4:2] in the Data Start Offset field.

TABLE 1

| Transmit Data Start Offset | | | | |
|---|---|---|---|---|
| Data Start Offset [1:0]: | 11 | 10 | 01 | 00 |
| First byte of transmit data: | D[31:24] | D[23:16] | D[15:8] | D[7:0] |

Transmit data 408 may be contiguous until the end of the buffer. In one embodiment, the Buffer End Alignment field in TX Command A 402 (as referenced in FIG. 6A) specifies the alignment to be maintained for the associated buffer. In one embodiment, buffer end alignment may be specified as 4-byte, 16-byte, or 32-byte. In alternate embodiments, the buffer end alignment may be specified beyond 64-bytes, in which the byte alignment size can extend to an unlimited value in 4-byte increments. Those skilled in the art will appreciate that buffer end alignment may be specified as per system requirements and is in no way limited to the buffer end alignment specifications as discussed herein.

Similar to the transmit flow, MAT apparatus 108 may be configured to provide a programmable offset for each receive buffer or packet, allowing the LAN driver software (or, more generally, the data communications driver software and/or host software) to deliver the network data at an optimal alignment without requiring any CPU intervention. In other words, MAT apparatus 108 may be operable to align receive data prior to the data being written into system memory 104 (referencing FIG. 2), as may be required by the system memory 104 (or alternate system memory 101) based on system memory 104 availability and allocation at the time data packets are received by system 100.

Figure 7:
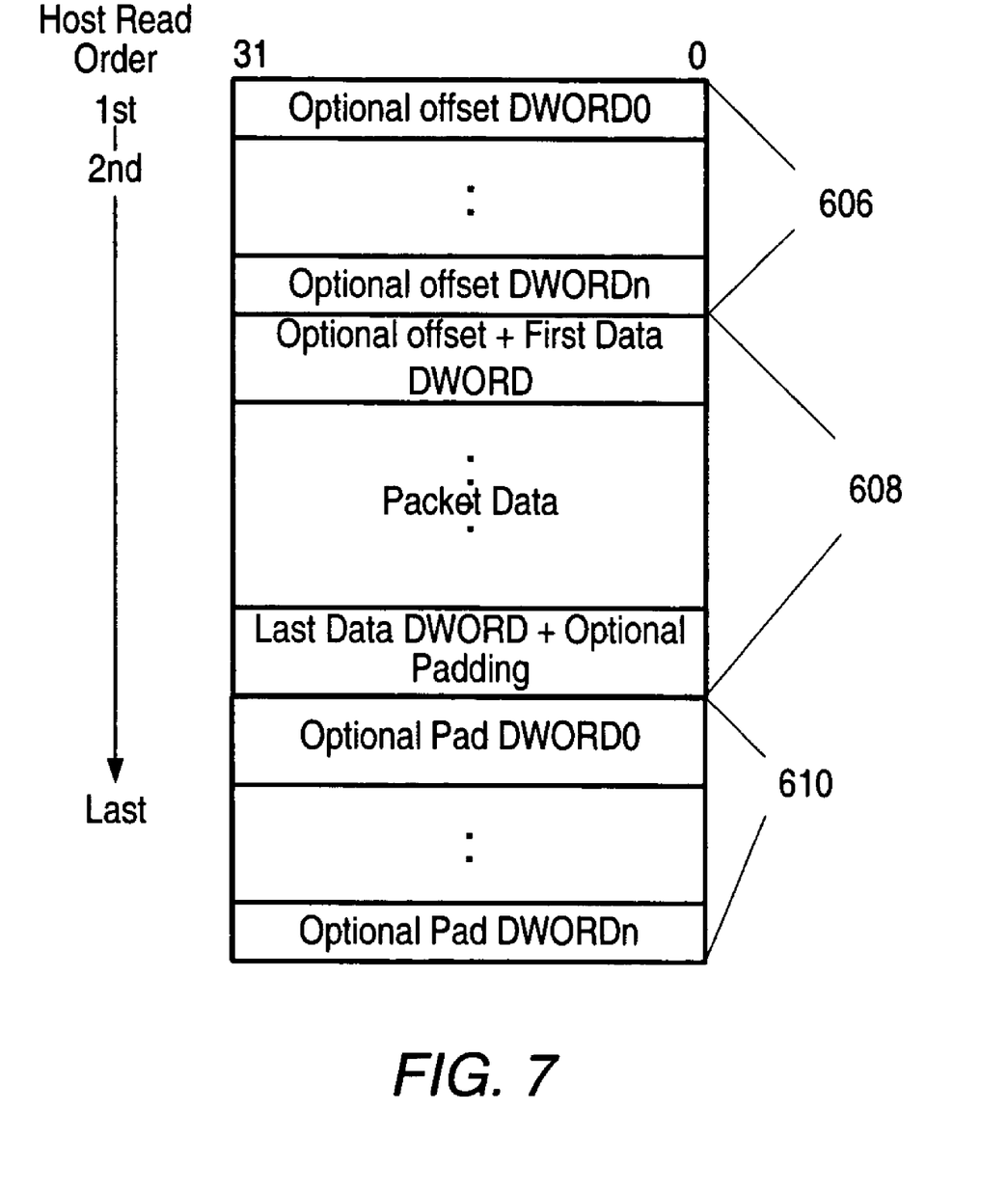
FIG. 7 illustrates one embodiment of the format of a receive buffer format.

In one embodiment, MAT apparatus 108 is configured to define if necessary, upon receiving an Ethernet packet, the amount of data buffer padding available, in order to align the data transfers on a 32-bit word boundary on both the prefix and postfix portion of the buffer. Receive status information may be read from RX Status FIFO 208 (referencing FIG. 3), while the received data packets may be read from RX Data FIFO 210. Received data packets may be formatted in a specific manner before making the data available on local bus 122 (referencing FIG. 2) to be stored in system memory 104 and/or alternate memory 101. In one embodiment, after having read the associated status information from RX Status FIFO 208 to ascertain the data size and any error conditions, formatting of receive data is performed according to the embodiment shown in FIG. 7. 32-bit fields defined as "offset DWORD0 to offset DWORDn" 606 may range from zero to thirty-one bytes. Thus, the buffer transfer may start with "n" number of bytes of prefix padding, followed by the actual received data (in other words, the packet payload) 608. Following the last data byte, which may be byte, 16-bit word or 32-bit word aligned, is "Pad DWORD0 to Optional Pad DWORDn" 610 postfix padding, which may be of a length of 4, 16, 32, or 64 bytes. As previously mentioned, the padding values shown are for illustrative purposes and are in no way meant to be limiting. Other padding values are possible and are contemplated. In one embodiment, the Postfix padding ends on a 32-bit word boundary, thus the number of actual postfix padded bytes may vary depending on the alignment of the last data byte. In alternate embodiments, the buffer end alignment may be specified beyond 64-bytes, in which case the byte alignment size can extend to an unlimited value in 4-byte increments.

Figure 9:
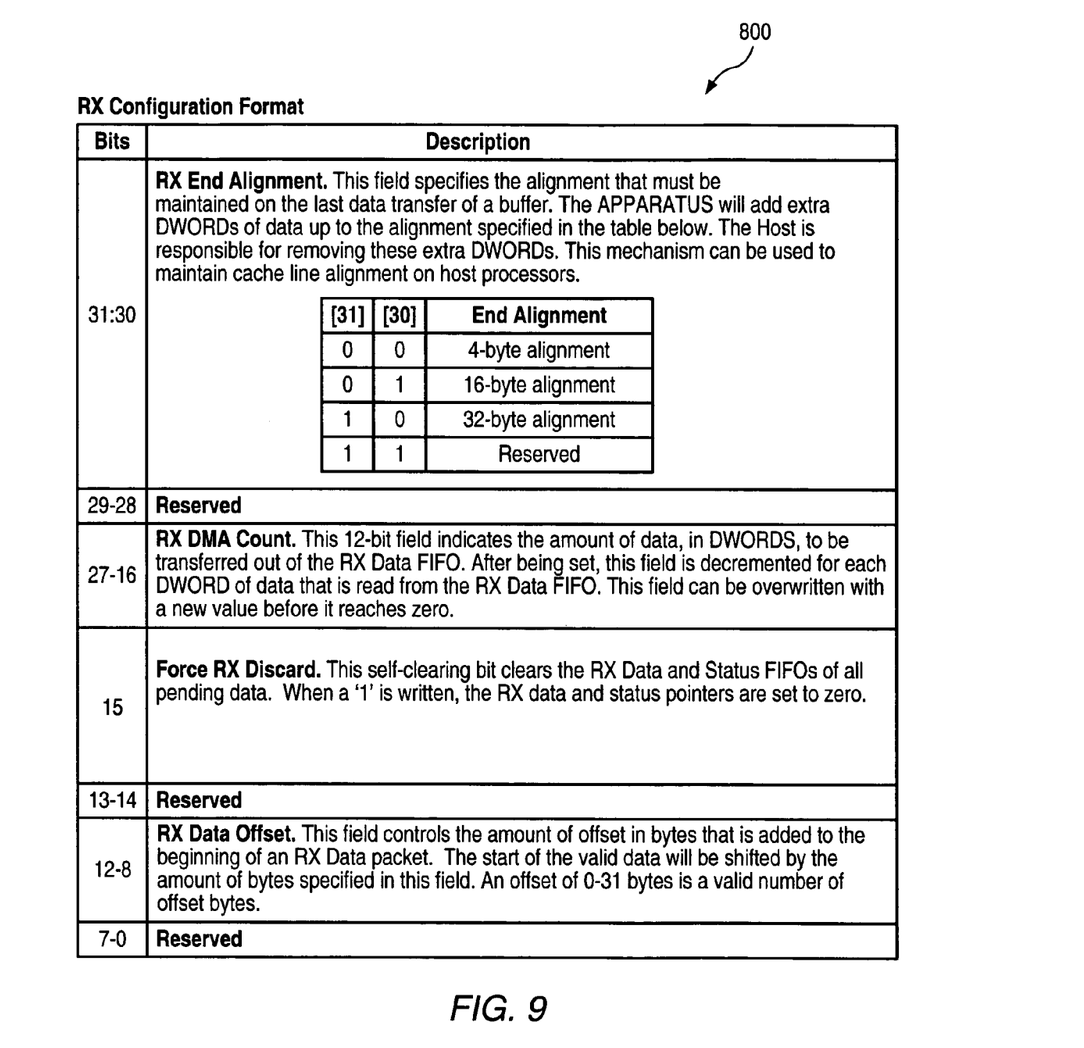
FIG. 9 illustrates one embodiment of the format of the receive format register.

FIG. 8 shows the receive status information that may be read from RX Status FIFO 208, according to one embodiment. FIG. 9 shows the receive configuration format that may be used by MAT apparatus 108 for formatting receive data buffers, according to one embodiment. An end alignment field (RX End Alignment) may specify the alignment that is to be maintained on the last data transfer of a buffer. MAT apparatus 108 may add extra 32-bit words of data up to the alignment specified in the table shown in the RX End Alignment section of FIG. 9. In one embodiment, this mechanism can be used to maintain cache line alignment on host processors (such as processor/controller 102 in FIG. 2). The RX DMA Count field may indicate the number of 32-bit words to be transferred out of RX Data FIFO 210 (referencing FIG. 3) for a specific transfer. After being set, this field may be decremented for each 32-bit data word being read from RX Data FIFO 210. The field may be overwritten with a new value before the count value reaches zero. Force RX Discard may be a self-clearing bit that may be set to clear RX Data FIFO 210 and RX Status FIFO 208 of all data. Finally, the RX Data Offset field may indicate the number of offset bytes that are added to the beginning of receive data packet, that is, optional offset DWORDS 606 shown in FIG. 7. The start of the valid data may be shifted by the amount of bytes specified in this field. In one set of embodiments, the valid number of offset bytes may be designated to vary between zero and thirty-one. In one embodiment, the driver software writes the receive configuration information into RX Format Register 209 located inside HBI 202.

Although the embodiments above have been described in considerable detail, other versions for data transfers over communications channels other than Ethernet are possible. Furthermore, numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A method for transferring data between a local memory configured in a host system, and a remote memory, wherein the host system comprises a network controller, the method comprising:

writing transfer command information corresponding to data residing in the local memory to a Programmed Input/Output (PIO) controller in the network controller, wherein the PIO controller interfaces through a shared common bus with one or more components of the host system configured outside the network controller;

writing the data from the local memory to the PIO controller through the shared common bus;

the PIO controller receiving the data and the corresponding transfer command information through the shared common bus, and transferring at least a portion of the received data to one or more buffers in the network controller as instructed by the corresponding transfer command information, said transferring comprising discarding any padding data and offset data comprised in the received data, and aligning any portion of the remaining received data that is unaligned, based on the corresponding transfer command information;

the one or more buffers receiving the at least a portion of the received data; and transferring the at least a portion of the received data from the one or more buffers in the network controller, according to the corresponding transfer command information, to the remote memory.

2. The method of claim 1, wherein said writing the transfer command information to the PIO controller comprises writing the transfer command information into one or more of:

one or more buffers configured to also receive the data; or
one or more registers dedicated to storing the transfer command information.

3. The method of claim 1, further comprising writing the data to one or more buffers comprised in the local memory prior to said writing the data from the local memory to the PIO controller.

4. The method of claim 3, wherein said writing the data to one or more buffers comprised in the local memory is performed by an operating system comprised in the host system.

5. The method of claim 1, wherein the remote memory is comprised in one or more of:

a system other than the host system; or
a peripheral device within the host system.

6. The method of claim 1, wherein the PIO controller is comprised in a host bus interface comprised in the network controller and configured to communicate with the host system.

7. The method of claim 1, wherein the host system is a computer system comprising a central processing unit and network driver software;

wherein said writing the data to the PIO controller and said writing the transfer command information to the PIO controller are performed by the network driver software; and wherein the network driver software is executed by the central processing unit.

8. The method of claim 7, wherein the central processing unit is one of:

an embedded microprocessor;
an embedded microcontroller;
a general purpose microprocessor; or
a general purpose microcontroller.

9. The method of claim 1, wherein said transferring the data to the remote memory comprises transferring the data in packets, wherein a packet comprises data and corresponding formatting information from one or more of the one or more buffers in the network controller.

10. The method of claim 9, wherein the formatting information comprises one or more of:

first transfer command information;
second transfer command information;
offset data; or
pad data.

11. The method of claim 10, wherein the first transfer command information comprises information corresponding to one or more of:

interrupt enable;
buffer end alignment;
data start offset;
first packet segment;
last packet segment; or
buffer size.

12. The method of claim 10, wherein the second transfer command information comprises information corresponding to one or more of:

packet tag;
CRC disable;
Ethernet frame padding disable; or
packet length.

13. The method of claim 1, further comprising:

receiving incoming data from the remote memory;
the network controller formatting the incoming data; and
delivering the formatted incoming data to the local memory comprised in the host system.

14. The method of claim 13, wherein said formatting the incoming data comprises one or more of:
   aligning the incoming data;
   adding offset data to the incoming data; or
   adding padding data to the incoming data.

15. The method of claim 13, wherein said receiving the incoming data from the remote memory comprises writing the incoming data into corresponding receive buffers in the network controller.

16. The method of claim 1, wherein the host system and the remote memory are connected via an Ethernet connection.

17. A host system comprising:
   a shared bus;
   a host system controller coupled to the shared bus;
   a local system memory; and
   a network controller coupled to the shared bus, and comprising:
      a host bus interface configured to transfer data over the shared bus between the network controller and the host system controller, and between the network controller and the local system memory, wherein the host bus interface comprises a Programmed Input/Output (PIO) controller configured to receive over the shared bus outgoing data originating from the local system memory, and further configured to receive over the shared bus, from the host system controller, transfer command information corresponding to the received outgoing data; and
      a transmit buffer coupled to the host bus interface;
   wherein the PIO controller is configured to route at least a portion of the received outgoing data into the transmit buffer according to the corresponding transfer command information, said routing comprising discarding any padding data and offset data comprised in the received outgoing data, and aligning any portion of the remaining received outgoing data that is unaligned, according to the corresponding transfer command information; and
   wherein the network controller is configured to transfer the at least a portion of the received outgoing data from the transmit buffer to a remote memory.

18. The host system of claim 17, wherein the network controller further comprises a receive buffer coupled to the host bus interface and configured to receive incoming data from the remote memory;
   wherein the PIO controller is further configured to receive, from the host system, transfer command information corresponding to the incoming data; and
   wherein the PIO controller is further configured to enable the host system to read the incoming data to the local system memory while aligning the incoming data based on the corresponding transfer command information.

19. The host system of claim 18, wherein the data communications controller further comprises:
   a transmit status buffer coupled to the host bus interface and configured to store transmit status information resulting from transferring the at least a portion of the received outgoing data from the transmit buffer to the remote memory; and
   a receive status buffer coupled to the host bus interface and configured to store receive status information resulting from receiving the incoming data from the remote memory.

20. The host system of claim 19, wherein the network controller further comprises a media access control module configured to:
   provide the transmit status information to the transmit status buffer;
   provide the receive status information to the receive status buffer;
   provide the incoming data to the receive buffer; and
   transfer the at least a portion of the received outgoing data from the transmit buffer.

21. The host system of claim 20, wherein the network controller further comprises a physical layer coupled to the media access control module.

22. The host system of claim 21, wherein the physical layer is an Ethernet physical layer and the media access control module is an Ethernet media access control module.

23. The host system of claim 19, wherein the receive status information comprises information corresponding to one or more of:
   address-recognizing-filtering failure;
   packet length;
   error status;
   frame broadcast address;
   length error;
   frame premature termination;
   frame multicast address;
   frame length;
   occurrence of frame collision;
   frame type;
   receive watchdog timeout;
   receive error detection;
   dribbling bit; or
   CRC error.

24. The host system of claim 17, wherein the remote memory is comprised in one of:
   the host system; or
   a remote system distinct from the host system.

25. The host system of claim 17, wherein the remote memory is comprised in a peripheral device comprised in the host system.

* * * * *